United States Patent [19]
Heritier et al.

[11] Patent Number: 5,455,838
[45] Date of Patent: Oct. 3, 1995

[54] SIDE PUMPING ARRANGEMENT

[75] Inventors: Jean-Marc Heritier, San Jose; Edward C. Rea, Jr., Palo Alto, both of Calif.

[73] Assignee: Hoya Corporation, Tokyo, Japan

[21] Appl. No.: 152,471

[22] Filed: Nov. 15, 1993

[51] Int. Cl.$^6$ ............................................. H01S 3/094
[52] U.S. Cl. ........................... 372/75; 372/35; 372/70
[58] Field of Search ................................. 372/75, 70, 69, 372/35

[56] References Cited

U.S. PATENT DOCUMENTS

| | | | |
|---|---|---|---|
| 4,852,109 | 7/1989 | Kuchar | 372/34 |
| 4,969,155 | 11/1990 | Kahan | 372/75 |

OTHER PUBLICATIONS

Scott, W. C. and M. deWit; "Birefringence Compensation and TEM$_{00}$ Mode Enhancement in a Nd:YAG Laser", *Applied Physics Letters;* vol. 18, No. 1; 1 Jan. 1971; pp. 3–4.

Burnham, Ralph L.; "Recent Advances in High Power Diode Pumped Solid State Lasers"; *Proceedings of Conference on Lasers and Electro–Optics;* 21–25 May 1990; CMF3, May 21, 1990 at 11:15 a.m.

Yoshida, Siro, et al.; "2.4–kW YAG Laser and its uses"; *Proceedings of Conference on Lasers and Electro–Optics; 21–25 May 1990;* CTUJ4, May 22, 1990 at 3:15 p.m.

Welford, David, et al.; "Efficient TEM$_{00}$–Mode Operation of a Laser–Diode Side–Pumped Nd:YAG Laser"; *Optics Letters;* vol. 16, No. 23; Dec. 1, 1991; pp. 1850–1852.

Welford, David, et al.; "Observation of Enhanced Thermal Lensing Due to Near–Gaussian Pump Energy Deposition in a Laser–Diode Side–Pumped Nd:YAG Laser", *IEEE Journal of Quantum Electronics;* vol. 28, No. 4; Apr. 1992; pp. 1075–1080.

Hays, A. D.; et al.; "High–Efficiency Diode–Array Side–Pumped Neodymium Lasers"; undated publication of FIBERTEK, Inc. and Spectra Diode Laboratories; pp. 484–485. (No Date).

Hughes, William; et al.; "Diode–Pumped High–Energy Pulsed Nd:YAG Lasers"; undated publication of Fibertek, Inc. (No Date).

"Fibertek, Inc.; A High–Technology Electro–Optics Company"; undated brochure of Fibertek, Inc. (No Date).

"1993 Laser Diode Product Catalog" of Spectra Diode Labs; p. 83. (No Month).

*Primary Examiner*—James W. Davie
*Attorney, Agent, or Firm*—Majestic, Parsons, Siebert & Hsue

[57] ABSTRACT

The use of rectangular cross-section gain material with two or more cylindrical lenses placed in close proximity or attached to opposite sides of the gain material allows for an efficient pumping of the gain material in an optical gain component. The optical gain component can be used in a laser device. Laser diode bars are arranged so as to pump the gain material through the lenses. A cooling apparatus can cool a rectangular cross-section gain material through two opposite flat sides so that no thermal birefringence is created. An optical gain component with two gain materials can orient these two gain materials such that the small-signal gain is almost circular and gaussian in profile with a large center peak tapering off to a much lower gain at the edges.

39 Claims, 9 Drawing Sheets

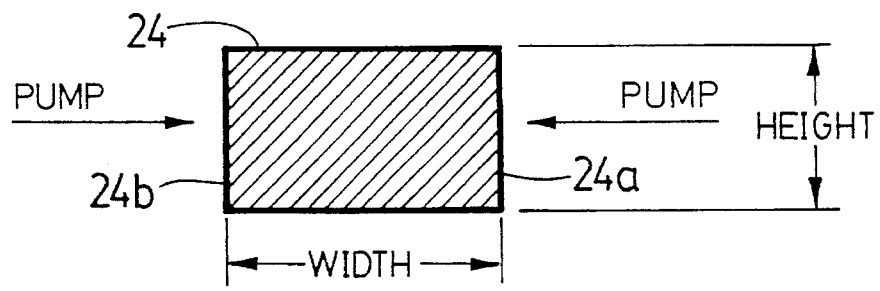
FIG._2.
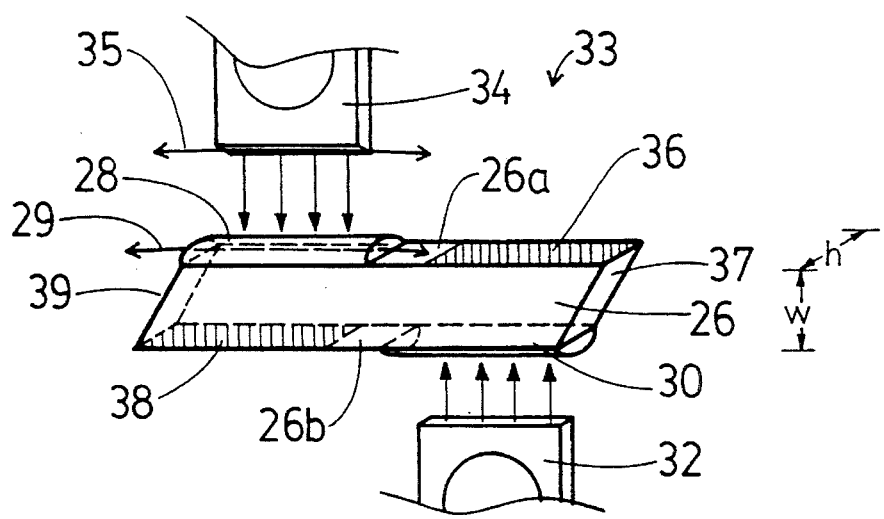
FIG._3A.
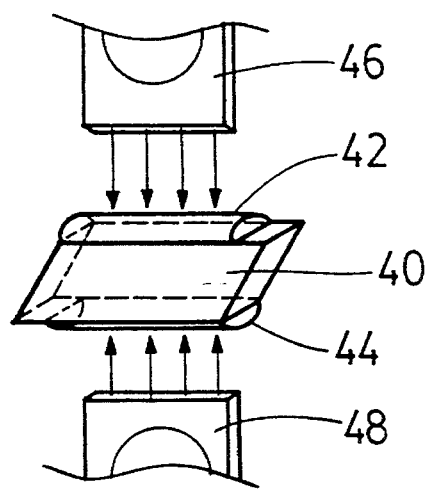
FIG._3B.

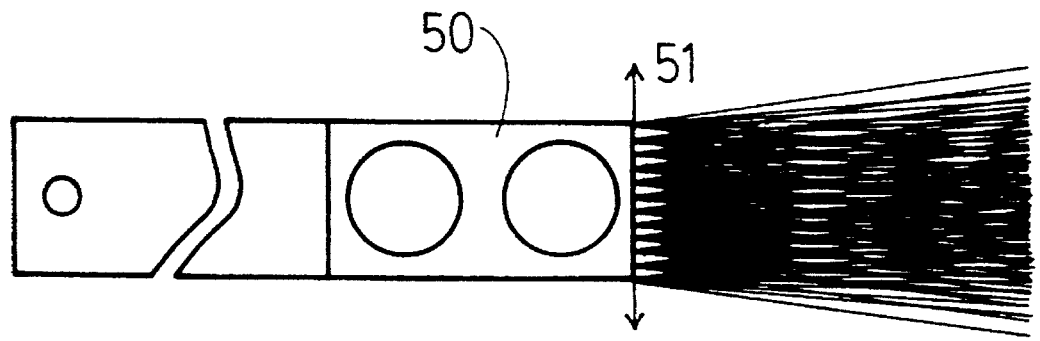
FIG._4A.
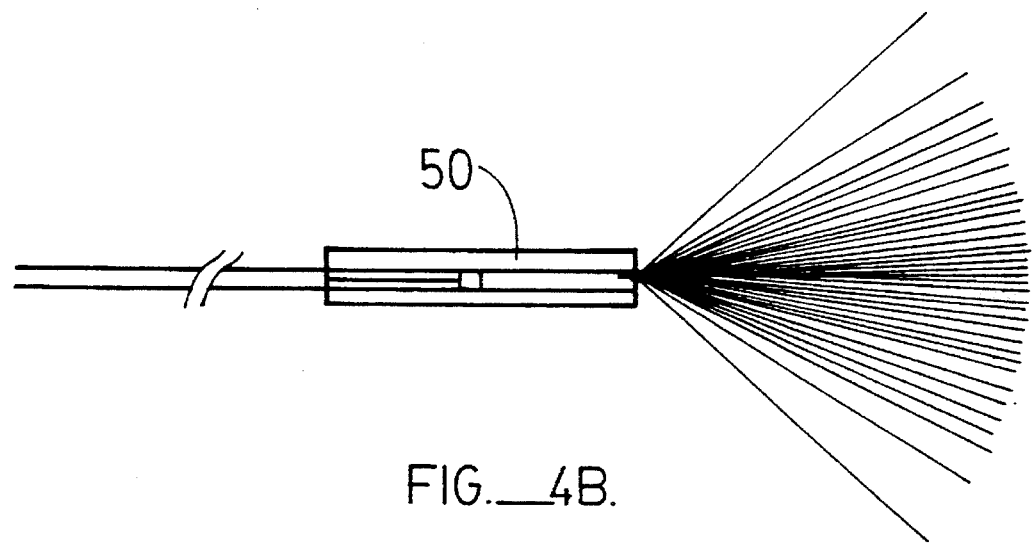
FIG._4B.
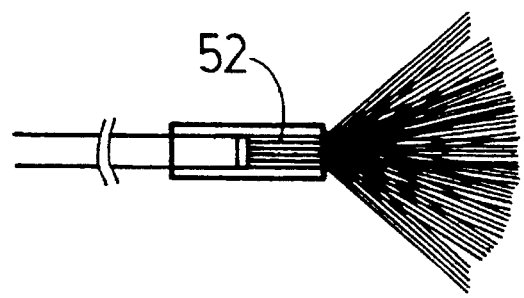
FIG._5.

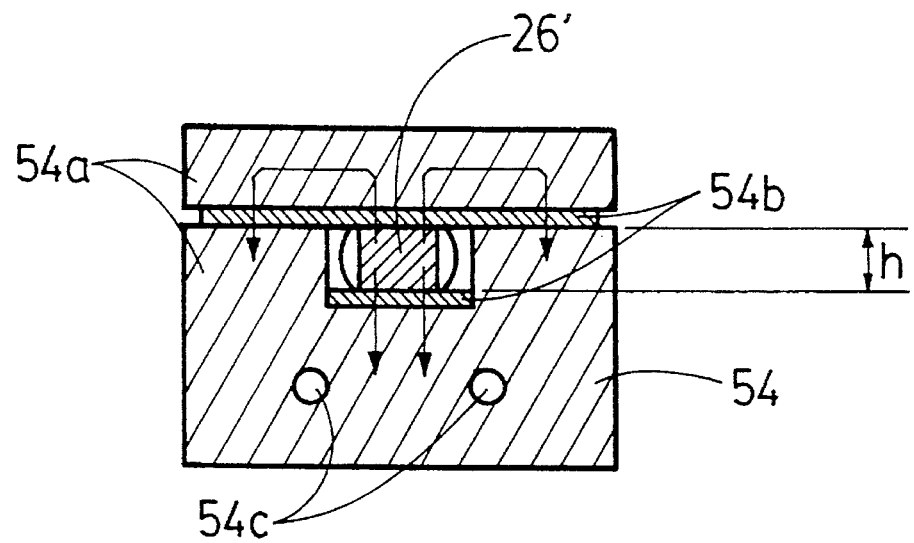
FIG._6.
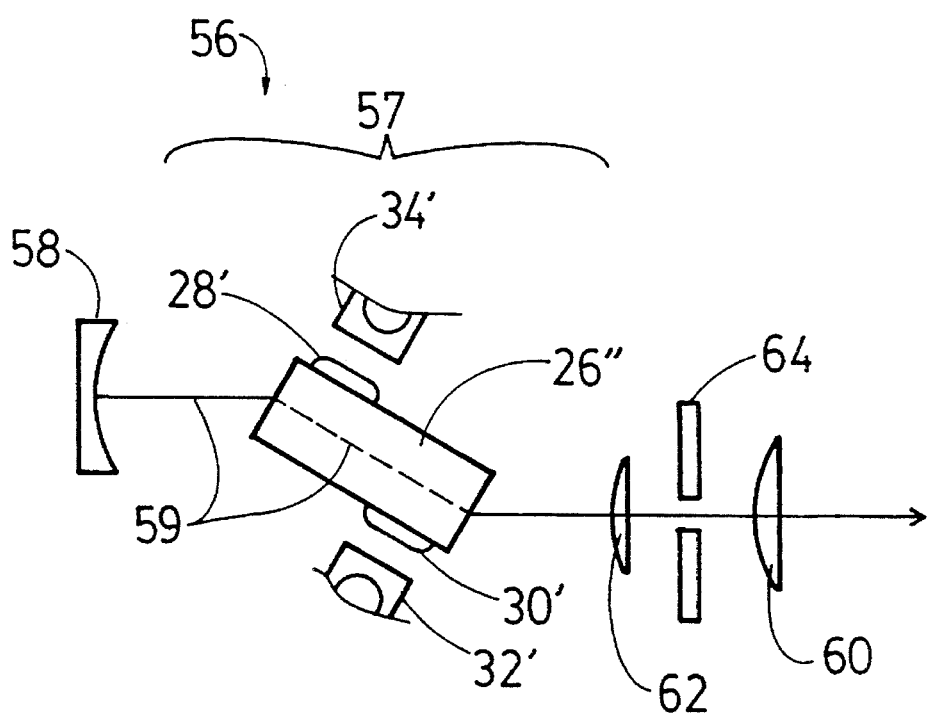
FIG._7.

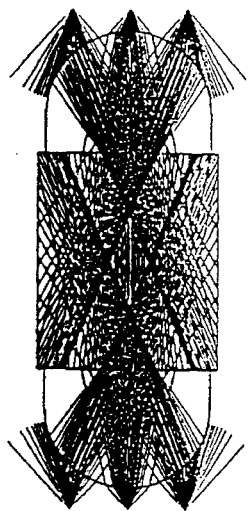
R = 1.15 mm
Lens thickness = 1.65mm
Distance diode to lens = 0.3mm
FIG._8C.
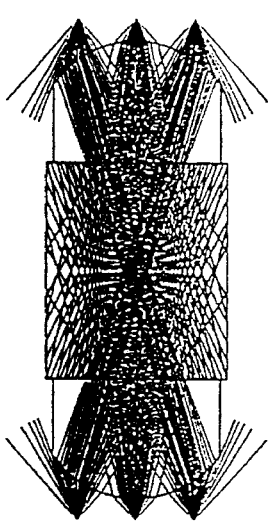
R = 1.4 mm
Lens thickness = 1.65mm
Distance diode to lens = 0.3mm
FIG._8F.
R = 1.15 mm
Lens thickness = 1.15mm
Distance diode to lens = 0.3mm
FIG._8B.
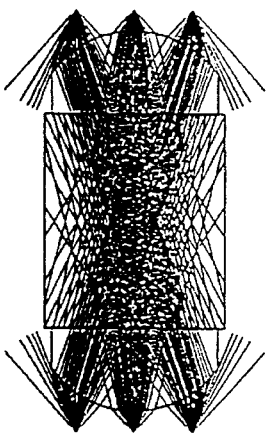
R = 1.4 mm
Lens thickness = 1.15mm
Distance diode to lens = 0.3mm
FIG._8E.
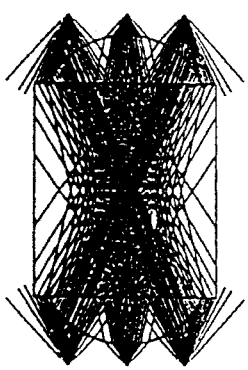
R = 1.15 mm
Lens thickness = 0.67mm
Distance diode to lens = 0.3mm
FIG._8A.
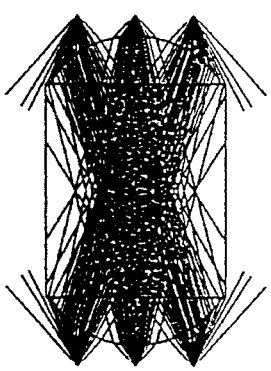
R = 1.4 mm
Lens thickness = 0.67mm
Distance diode to lens = 0.3mm
FIG._8D.

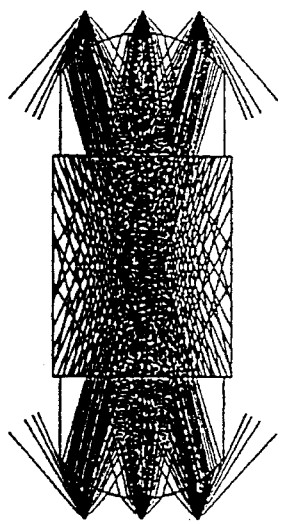
R = 1.5mm
Lens thickness = 1.65mm
Distance diode to lens = 0.3mm
FIG._8I.
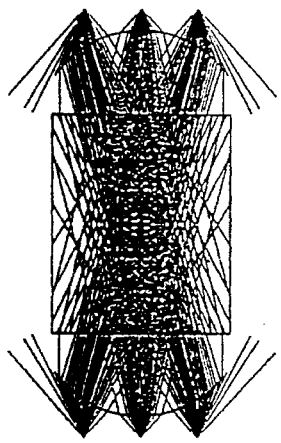
R = 1.5mm
Lens thickness = 1.15mm
Distance diode to lens = 0.3mm
FIG._8H.
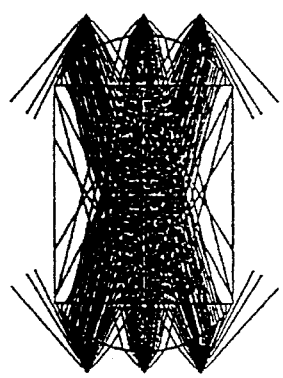
R = 1.5mm
Lens thickness = 0.67mm
Distance diode to lens = 0.3mm
FIG._8G.

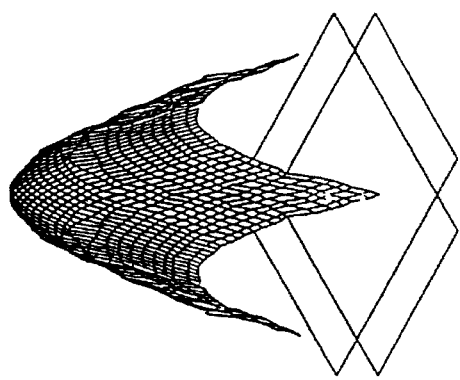
FIG._11B.
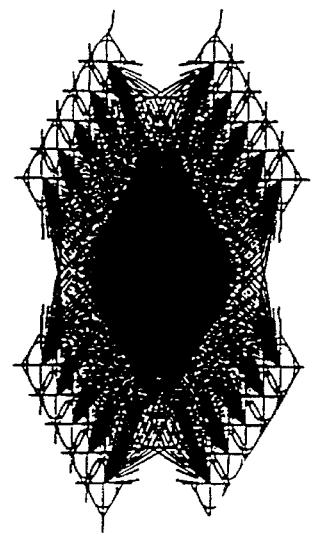
FIG._11A.
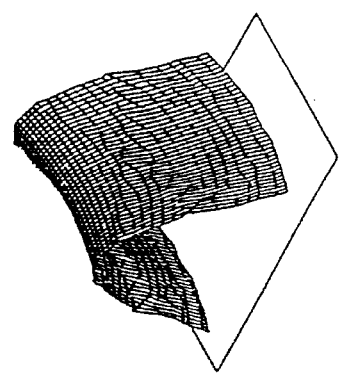
FIG._10B.
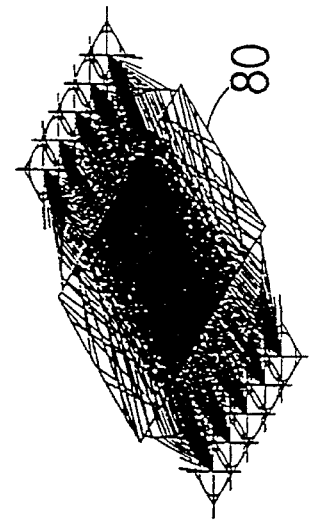
FIG._10A.
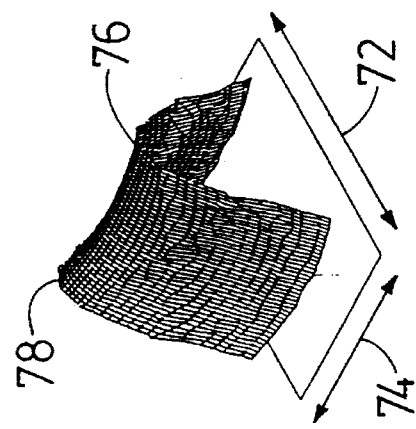
FIG._9B.
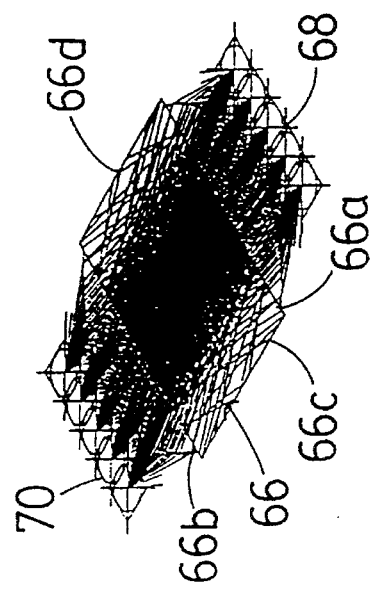
FIG._9A.

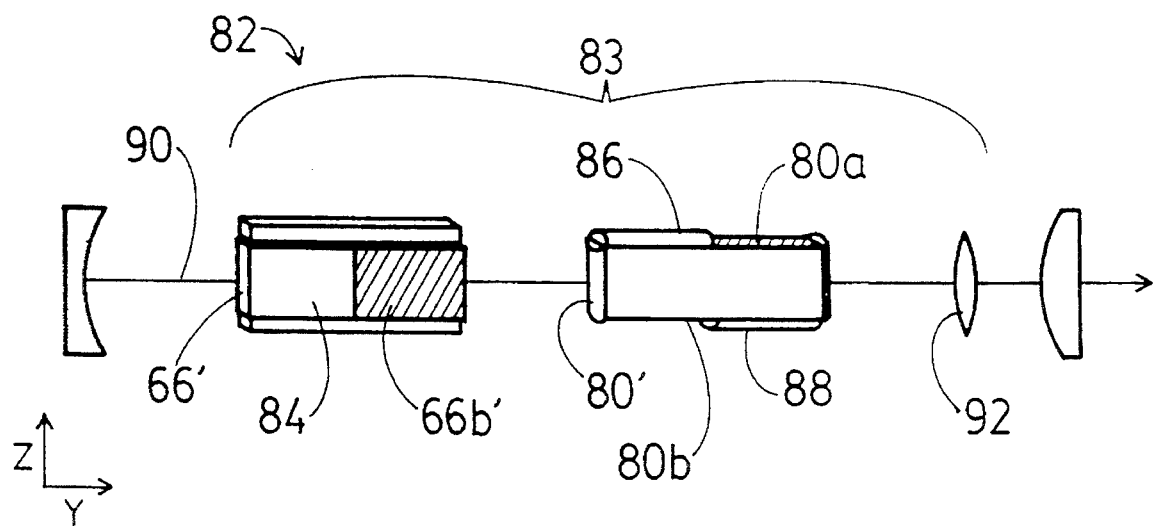
FIG._12.
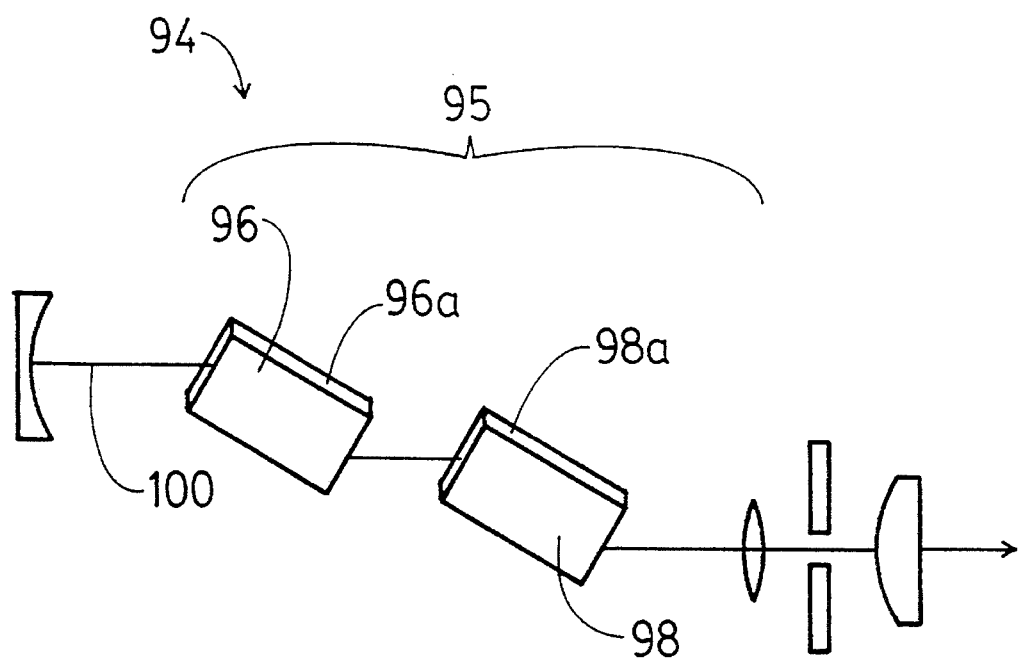
FIG._15.

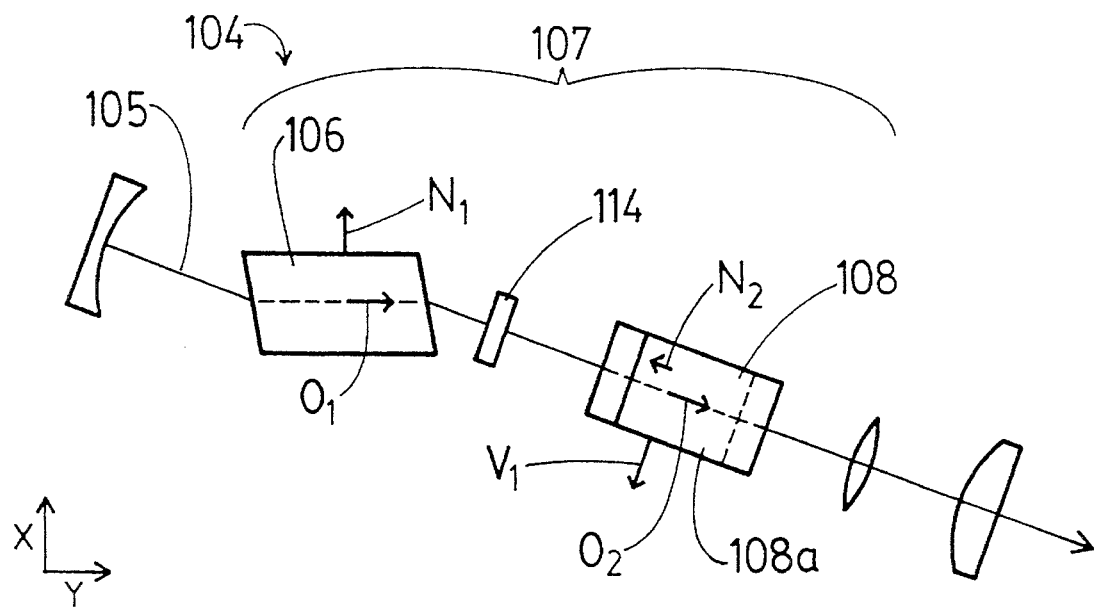
FIG._13A.
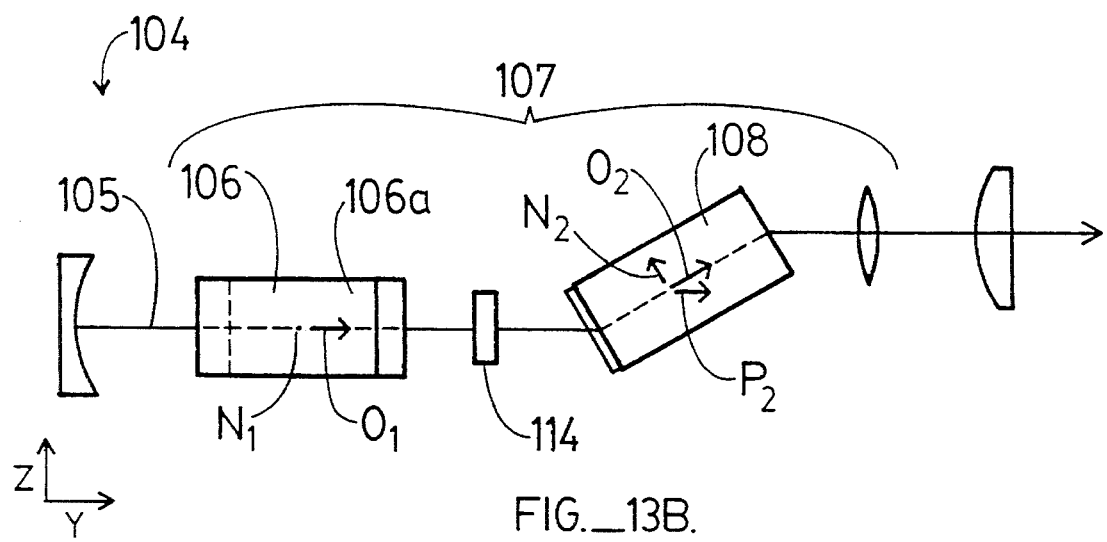
FIG._13B.
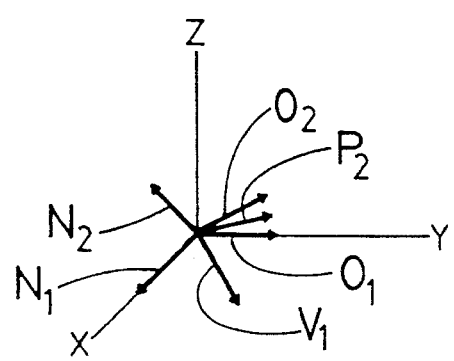
FIG._13C.
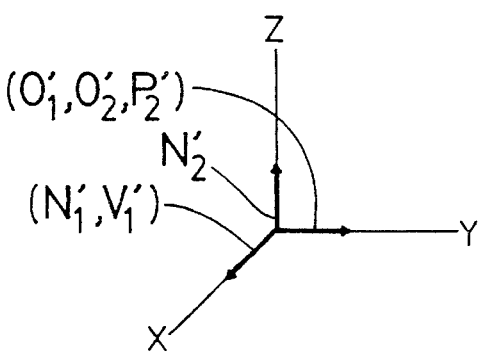
FIG._14.

SIDE PUMPING ARRANGEMENT

BACKGROUND OF THE INVENTION

The present invention relates to an optical gain component having a gain material which is side pumped by laser diodes. The optical gain component can be used in a laser device. In side pumping a laser gain medium, it is desired to achieve both a high average gain value and a uniform gain distribution. The large divergence angles typical of the emission from laser diodes make these goals difficult to achieve.

A prior art side pumping arrangement is described in Welford et al. "Efficient $TEM_{00}$-mode Operation Of A Laser-Diode Side Pumped Nd: YAG Laser", Optics Letters, Vol. 16, No. 23, (Dec. 1, 1991), pp. 850–852. This article describes the side pumping arrangement shown in FIG. 1. FIG. 1 is a cross-sectional view of a prior art gain material 20. This figure shows a cross-section through the optical axis of the gain material 20. The gain material 20 has a semi-circular curvature 20a used for collecting and roughly collimating the emission from the pump diodes 22. The pump energy is reflected back through the gain material by a reflective coating on side 20b. The gain material 20 is also cooled along this side 20b. A five-bar stack of laser diodes 22 is located 0.5 mm from the gain material 20 along the side 20a. In this prior art arrangement, the gain is effectively peaked at the location that the diode energy enters the gain material 20.

This geometry has several disadvantages. First, the rod curvature is used for collimating the pump diodes but also restricts the thickness of the laser medium seen by the diode. For this reason, the flexibility of this technique is limited. Second, this geometry allows for laser diode stacks along side 20a only. If additional laser diode stacks are to be used to pump the gain material from different directions, another rod must be included. Finally, since the cooling of the rod is done along the surface 20b, the cooling is one dimensional and non-symmetrical. This results in a thermal wedge as the rod is pumped harder, so that the laser alignment changes with the average pump power. The laser alignment may also change over time as the diode ages. For the same reason, the gain center (centroid of the gain distribution) does not coincide with the thermal lens center.

It is desired to have an improved arrangement for side pumping a gain material in an optical gain component.

SUMMARY OF THE INVENTION

An advantage of the present invention is the use of a rectangular cross-section gain material with two cylindrical lenses placed in close proximity or attached to opposite sides of the gain medium. The lenses can collect and roughly collimate pump energy from two stacks of laser diode bars. These diode bars do not need to be individually collimated and for that reason the less expensive non-collimated laser diodes can be used. Additionally, the cylindrical lenses can be attached to the opposite sides of the gain material with an optical cement.

The use of a rectangular cross-section gain material allows for the gain material to be pumped from more than one side.

The gain material, cylindrical lenses and laser diodes form an optical gain component. This optical gain component can be used in a laser device. Alternatively, the optical gain component could be used in an optical signal amplifier.

Another aspect of the present invention regards a cooling apparatus for use with a rectangular cross-sectional gain material. This cooling apparatus cools two opposite sides of the gain material. A benefit of using the cooling apparatus of the present invention which cools the two opposite sides of a rectangular cross-sectional gain material is that when the gain material is pumped from its two other sides, a temperature gradient is formed wherein the temperature primarily depends on the distance from the cooled sides. In effect, the cooling apparatus produces a cylindrical thermal lens which can be compensated for by a simple cylindrical lens placed on the optical axis of the optical gain component. A benefit of the cooling apparatus of the present invention is that thermal birefringence is minimized. Thermal birefringence can disturb the polarizations of the laser beams in a laser device.

An additional aspect of the present invention concerns the use of two gain materials. The two gain materials individually have a saddle shaped gain profile. By pumping the second gain material at a different orientation about the optical axis from the pumping of the first gain material, the superposition of the two gain profiles can produce a more desirable gain distribution. For example, the case of a 90° rotation between two saddle shaped gain profiles can produce a substantially circular bell-shaped gain profile. This substantially circular bell-shaped gain profile can help produce a $TEM_{00}$ lasing mode. Additionally, the resulting combined thermal lens for the two gain materials can produce a spherical thermal lens which is simpler to compensate for than a cylindrical lens.

BRIEF DESCRIPTION OF THE DRAWINGS

The above and other features and aspects of the present invention will become more apparent upon reading the following detailed description in conjunction with the accompanying drawings, in which:

FIG. 2 is a cross-sectional view of the gain material of the present invention.

FIG. 3A is a perspective view of the gain material of the present invention with attached cylindrical lenses.

FIG. 3B is a perspective view of an alternate embodiment of the gain material with attached cylindrical lenses.

FIG. 4A is a top view of a laser diode bar and its emission pattern used with the present invention.

FIG. 4B is a side view of the laser diode bar and its emission pattern shown in FIG. 4A.

FIG. 5 is a side view of a stack of five laser diode bars for use with the present invention.

FIG. 6 is a cross-sectional view of the cooling apparatus of the present invention.

FIG. 7 is a side view of a laser device showing the optical gain component of the present invention.

FIGS. 8A–I are cross-sectional views of cylindrical lenses and gain materials showing the effects of lens curvature and thickness on pump energy density for given pump configuration.

FIG. 9A is a schematic view of a gain material pumped from two opposite sides showing a ray tracing representation.

FIG. 9B is a three-dimensional image showing the small signal gain of the apparatus of FIG. 9A.

FIG. 10A is a schematic view of another gain material pumped from two sides showing a ray tracing representation.

FIG. 10B is a three-dimensional image showing the small signal gain from the apparatus of FIG. 10A.

FIG. 11A is a schematic view superimposing the ray tracing representations of FIGS. 9A and 10A.

FIG. 11B is a three-dimensional image showing the combined small-signal gain through the apparatus of FIGS. 11A.

FIG. 12 is a side view of a laser device showing the optical gain medium of the present invention with two gain material rods.

FIG. 13A is a top schematic view of yet another embodiment of a laser device showing an optical gain component of the present invention.

FIG. 13B is a side schematic view of the embodiment of the laser device shown in FIG. 13A.

FIG. 13C is a graph which is used to show the vectors from FIGS. 13A and 13B.

FIG. 14 is a graph which is used to show the vectors from FIG. 12.

FIG. 15 is a perspective view of an alternate embodiment of a laser device showing an optical gain material of the present invention.

DETAILED DESCRIPTION OF THE PREFERRED EMBODIMENT

Figure 1:
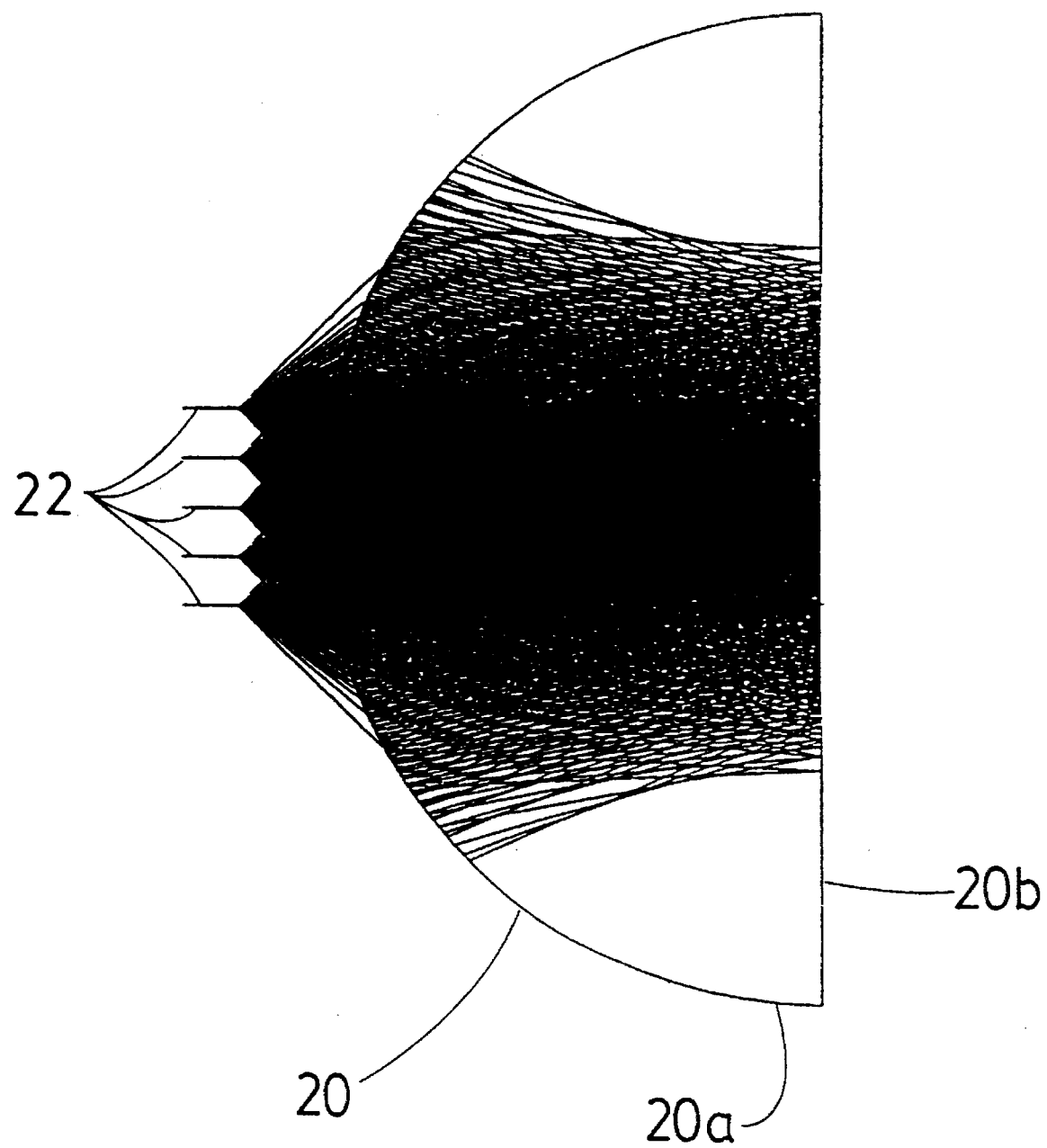
FIG. 1 is a cross-sectional view of a prior art gain material showing diode side pumping.

FIG. 2 is a cross-sectional view of the gain material 24 of the present invention. The gain material 24 can be pumped from sides 24a and 24b. Pump light rays are absorbed during the propagation through the gain material so that their intensity decreases exponentially. After a distance R, the intensity is reduced by a factor $EXP(-R/R_0)$, where $R_0$ is the absorption depth, a constant which is characteristic of the specific choice of solid-state laser material, pump wavelength, and pump bandwidth (wavelength spread). The deposited pump energy and therefore, the optical gain also follow that law, decreasing exponentially with distance from the pump source.

The gain medium 24 has a rectangular cross-section and is pumped through one side face 24a or through two opposing side faces 24a and 24b. The optical depth considerations imply that the rod width should be around 1–2 times $R_0$. If the width is much shorter than $R_0$, the average gain value will be close to the peak value but the net amount of deposited energy and the laser conversion efficiency will be low. Much of the pump energy in this situation would not be absorbed by the gain material. If the width of the gain material is much longer than $R_0$, then nearly all the pump energy will be absorbed in the laser medium but the gain distribution will be very non-uniform.

In the configuration shown in FIG. 2, the height of the gain material remains a free parameter. Only the width is fixed by the absorption characteristics in the laser medium. In the present invention, the gain is maximized by minimizing the height of the pumped region in the gain material 24 thereby minimizing the cross-sectional area as viewed along the optical axis. Using the embodiment of the present invention shown in FIG. 12 which has two gain materials one oriented substantially 90° about the optical axis from the other may constrain the height of the gain regions, however.

Looking again at FIG. 2, the gain material 24 in the present invention is preferably made of Nd:YAG. Nd:YAG is a well known laser material which has an absorption depth, $R_0$, of about 2.5 mm at the peak absorption frequency of 808 nm, assuming a pump band width of around 4 nm full-width half-maximum (FWHM). Other gain materials can be used in the present invention, such as Nd:YLF, Nd:YVO$_4$, Nd:Doped Glass, or any other lasant material.

FIG. 3A is a perspective view of the gain material 26 of the present invention with attached cylindrical lenses 28 and 30. The optical gain component 33 has its optical axis arranged through gain material 26 which is a rectangular cross-section lasant rod. The gain material 26 has four sides and two ends. The gain material 26 is pumped by stacks 32 and 34 of laser diode bars positioned along opposite sides 26a and 26b of the gain material 26. The cylindrical lenses 28 and 30 may be made of materials with different optical and/or physical properties than that of the gain material 26. For example, the cylindrical lenses 28 and 30 can have a different index of refraction or a different thermal conductivity from the gain material 26. Preferably, the cylindrical lenses 28 and 30 are non-absorbent of the pumping energy and have a high index of refraction. In the preferred embodiment, the cylindrical lenses 28 and 30 are made of undoped YAG. The curvature of the lenses' surfaces can be engineered to accommodate different pumping requirements and to shape the distribution of the deposited pump energy as can be shown in FIGS. 8A–I discussed below.

Looking again at FIG. 3A, the lenses 28 and 30 can also be attached directly to the gain material 26 with an optical adhesive to create a monolithic, compact and rugged rod assembly. Flat surfaces of the cylindrical lenses 28 and 30 are attached to the gain material 26. The optical adhesive is chosen to be non-absorbent of the pumping energy.

In the preferred embodiment, the optical adhesive is "Norland 61" UV-curing photopolymer available from Norland Products Incorporated which is located in New Brunswick, N.J. The "Norland 61" UV-curing photopolymer has a refractive index of about 1.56 and the undoped YAG lenses 28 and 30 and Nd:YAG gain material 26 have refractive indexes of 1.82. For this reason, there is a partial index match between the adhesive and the undoped YAG lenses 28 and 30 and Nd:YAG gain material 26 which reduces the effective reflectance of the optical surface and improves pump energy transfer. More importantly, the optical adhesive should have a low viscosity before curing and form a thin adhesive layer during assembly. A thin adhesive layer minimizes thermal problems.

Additionally, the attachment of the cylindrical lenses 28 and 30 to the gain material 26 should be done in a very clean environment. If dust particles are trapped in the adhesive layer, these particles may absorb pumping energy when the optical gain component is operating. This absorption will cause the dust particles to heat up and may damage the optical gain component.

The cylindrical lenses 28 and 30 can be used to optically compress the height of the pumped region. Furthermore, the pumped beams can be effectively focused and become progressively more intense as they propagate through the gain material 26 so that the focusing offsets the accompanying intensity loss due to absorption of the pump radiation by the rod. This allows for the resulting gain to remain substantially flat across the rod width. In the orthogonal direction along height of the gain material 26, the small signal gain will mimic the pump laser intensity profile and look somewhat gaussian, tapering off to zero on each side of a well defined central peak. The small-signal gain can be seen best with respect to FIG. 9B which is discussed below.

Looking again at FIG. 3A, note that the stack of laser diodes 34 is arranged such that its long axis 35 is parallel to the long axis 29 of the cylindrical lens 28. This allows the curvature of the cylindrical lens 28 to focus the pump beams perpendicular to the laser diode bar. The pump beams perpendicular to the laser diode bar are of good quality as discussed below with respect to FIGS. 4A–B and FIG. 5.

Looking again at FIG. 3A, the width of the gain material 26 is dictated by the absorption characteristics of the gain material. Under some circumstances, this width may be greater than is considered desirable. If angled end faces are fabricated onto the rod, the laser beam within the rod can be expanded along the width of the gain material so as to compensate for the undesirable width of the pumped region. This refractive expansion is equivalent to apparent external image compression. For example, in 3 mm-wide rod made from Nd:YAG a gain region 3 mm-wide× 1.6 mm-high would "look" like only 1.65 mm×1.6 mm to an external observer if its faces 37 and 39 were tilted at a Brewster angle. The Brewster angled ends 37 and 39 also define the preferred polarization of the laser beam.

The gain material 26 can be configured in such a way that the stacks 32 and 34 of laser diode bars do not directly face each other but are offset along the length of the gain material 26. A highly reflective coating 36 reflects the unabsorbed pump light from the stack 32 back through the gain material 26 and a highly reflective coating 38 reflects the unabsorbed pump light from the stack 34 back through the gain material 26. This effectively doubles the optical thickness of the rod since the pump light can be absorbed as it moves towards the highly reflective coatings 36 and 38 and as it is reflected back from the highly reflective coatings 36 and 38. The use of the highly reflective coatings 36 and 38 allows for narrower rod designs or for enhanced absorption efficiency and higher gain for a given rod dimension.

FIG. 3B is a perspective view of an alternate embodiment of the gain material 40, cylindrical lenses 42 and 44 and stacks 46 and 48 of laser pumping diode bars. Note that in this alternate embodiment, the stacks 46 and 48 of laser pumping diode bars can be arranged so that they directly face each other across the gain material 40.

In FIGS. 4A–B and 5 a ray tracing representation of the "beam" emitted by the typical bars is shown. FIG. 4A is a top view of a stack of laser diode bars used with the present invention. The ray density is shown as proportional to the observed intensity of emission. Diode bar 50 has a long axis 51. The aperture width of the typical diode bar is about 1 centimeter along this long axis 51. In a plane parallel to the long axis 51, the emitted light has a relatively low spreading angle (beam divergence) of about 10° full-width half-maximum FWHM but the beam quality is very poor. The beam quality can be defined as a product of the beam size at the focus multiplied by the beam divergence. For a diffraction-limited beam, this product is directly proportional to a lasing wavelength λ:

$$\text{size} \times \text{divergence} = .44\lambda$$

where the size is the beam FWHM at the location of the minimum spot size along the propagation path and the divergence is the FWHM of the beam spread expressed in radians. For a typical diode bar, the resultant product is around 4,900 times larger than a diffraction-limited or "perfect" beam and the emitted light can be considered very incoherent spatially. The minimum beam size that can be obtained using a fast focusing lens will therefore be of the order of around 1 centimeter.

FIG. 4B is a side view of a laser diode bar 50 used with the present invention. Looking at the plane perpendicular to the long axis 51 of the diode bar 50, in the typical commercial laser diode bar the emitting regions are around 1 micron or 0.000040 inches thick. The emitting regions have a relatively large divergence of around 30° to 45° FWHM but the beam quality is excellent, with a nearly gaussian intensity profile. The light emitted in this plane is spatially highly coherent, and the minimum beam size that can be obtained by using a fast focusing lens would be of the order of 1 micron, approaching the same size as the emitting aperture. Note that as seen in FIG. 3A, aligning the long axis 35 of the stack 34 of diode bars with the long axis of the cylindrical lens allows for the highly coherent light in the plane perpendicular to the long axis 35 of the stack 34 to be focused by the curvature of the cylindrical lens 28. The cylindrical lenses used with the present invention collect and roughly collimate the emitted pump energy.

FIG. 5 shows a side view of a stack 52 of five laser diode bars. A typical laser-diode side-pumped solid state laser may use several bars put together in assembly called a laser diode bar stack. In the preferred embodiment, the non-collimated laser diode bars are available from SDL, Inc., San Jose, Calif. 95134. A stack of non-collimated laser diode bars is defined to be a stack of laser diode bars which are not individually collimated by a short focal length lens attached to each bar. Note that in the present invention, the stack 52 of laser diode bars need not be collimated laser diode bars. Collimated laser diodes use very short focal length collimating lenses attached to each bar of the laser diode stack. These collimated laser diode bars are much more expensive than non-collimated laser diode bars. Additionally, because the collimating lenses have very short focal lengths, they must be positioned very precisely with respect to the laser diode bar's aperture. An example of collimated laser diode bars is shown in the 1993 Laser Diode Product Guide for Spectra Diode Labs on page 83.

FIG. 6 is a cross-sectional view of a cooling apparatus 54 of the present invention. This cooling apparatus contacts two opposite flat surfaces of the gain material 26'. These two opposite flat surfaces are the surfaces of the gain material 26' which are not pumped by the stacks of laser diodes (not shown). The cooling apparatus 54 is comprised of metal support blocks 54a, pads 54b made of a deformable, compliant, thermally-conductive material and coolant passages 54c. The pads 54b made of a deformable, compliant, thermally-conductive material provide an intimate contact between the gain material 26' and the metal support blocks 54a for good heat transfer. The pads 54b could be made of indium foil or alternately made of a T-pli material, a highly-conformable, thermally-conductive elastomer available from Thermagon, Inc., located in Cleveland, Ohio. The T-Pli material is less thermally-conductive than indium foil but has the advantage that less pressure is required to form a good thermal contact with the gain material. Too much pressure on the gain material may cause undesirable stresses within the gain material.

The arrows in FIG. 6 indicate the path of the heat flow in this cross-sectional view. The cooling apparatus 54 exploits the rectangular cross-section of the gain material 26' to efficiently extract heat in the plane perpendicular to the direction of pumping. This induces a temperature gradient confined predominantly to the height of the rod. That is, the temperature is dependent upon the distance from the two opposite flat surfaces which contact the coolant apparatus 54. This temperature gradient produces a simple cylindrical lens with an axis which is independent of the pump power level (no prismatic distortion is introduced) and can be compensated for by placing one or more cylindrical lens beyond one or both ends of the laser rod. Additionally, this one-dimensional heat removal technique is well adapted to reducing the thermal birefringence in high power applications. Thermal birefringence can affect the polarization of the laser beam in a gain material.

FIG. 7 is a side view of a laser device 56 showing the optical gain component 57 of the present invention. Shown is a gain material 26" pumped with stacks 34' and 32' of laser diode bars through cylindrical lenses 28' and 30'. Since the gain material 26" has Brewster-angled end faces, the optical axis 59 of the laser device 56 turns in the gain material 26". The laser device 56 includes one concave end mirror 58 and one convex end mirror 60. The use of a convex end mirror 60 can expand the laser beam mode volume so that it is similar to the pumping mode volume in the gain material 26". A cylindrical lens 62 is used to compensate for the thermal lens formed by the cooling of the gain material 26". A round aperture 64 is placed inside the laser cavity so that the laser device 56 is forced into a $TEM_{00}$ mode. Looking at FIG. 9A and 9B, the small-signal gain tends to be slightly saddle shaped which can cause a $TEM_{01}$ mode to form which has two lobes. The aperture 64 prevents the $TEM_{01}$ mode from forming. Alternately, a slit could be used rather than the round aperture 64. For clarity the cooling apparatus is not shown but the cooling apparatus would be attached to the two opposite flat sides not pumped by the stacks of the laser diode 32' or 34'. Note that additional elements such as mirrors, Q-switches and non-linear materials can be used with the laser device 56.

The optical gain component 57 comprising the gain material 26", the cylindrical lenses 28' and 30', the laser diode stacks 32' and 34', and the cooling apparatus (not shown) could also be used in a device to amplify optical signals.

FIGS. 8A–I are cross-sectional views of a gain material showing the effect of lens curvature and lens thickness upon the pump energy density for a given pump configuration. A matrix of cross-sectional views corresponding to a 3 mm wide×2.5 mm tall gain material pumped from opposite sides by a pair of stacks of laser diode bars is shown. Along the bottom is given the lens thickness for each column. Along the left hand side is given the lens curvature, R, of the cylindrical lenses for each row. Using a ray tracing program, one can find the gain in the medium. The best shaped cylindrical lens can be found according to several criteria: highest gain (as seen by certain size gaussian $TEM_{00}$ beam crossing the laser medium; and/or best selectivity for the $TEM_{00}$ mode, i.e. high gain for the $TEM_{00}$ mode as opposed to the $TEM_{01}$ mode. In the preferred embodiment shown in FIG. 8G, the lens thickness 0.67 mm and curvature R=1.5 mm would be used for the 3 mm wide×2.5 mm tall rod pumped by opposite sides pair of 3-bar laser diode stacks with a distance to the lens of 0.3 mm. The distance between the laser diode stack and the lens is desired to be as small as possible. The details of the preferred embodiment discussed above correspond to the embodiment shown in FIG. 3A, however, the ray tracings in FIGS. 8A–I do not show reflections off the highly reflective coating for the sake of clarity.

It is desired that the laser diode bars are stacked as close together as possible. Due to heat dissipation requirements, however, the duty factor (time on/total time) of the laser diode bars is limited by the spacing between the laser diode bars. Currently, a laser diode stack with a 6% duty factor is available with a spacing between the laser diode bars of 0.8 mm.

The focusing of the pump energy is used to produce a small pumped cross-sectional area which produces a larger small signal gain. Additionally, as discussed above, it is desired that the pumping beams become focused as they propagate so as to offset the accompanying intensity loss due to absorption in the gain material. The emitted pump energy from the different diode bars converge towards the centerline of the gain materials as they propagate. Another aspect of the present invention involves using two rectangular rods each of which has a saddle shaped gain profile. These rods can be arranged so that the net gain would appear to be almost circularly symmetric and bell-shaped in profile with a large center peak tapering off to a much lower gain at the edges. Furthermore, the resulting thermal lens will now look like a spherical lens which is easier to compensate for than a cylindrical lens. The composite structure will still be largely free of thermal birefringence, a major advantage over other schemes. FIGS. 9A–B, 10A–B and 11A–B illustrate this concept.

FIG. 9A is a schematic view of a gain material 66 pumped from two opposite sides 66a and 66b showing ray tracing representations. Also shown are laser diode stacks 68 and 70. The gain material 66 can be cooled along sides 66c and 66d.

FIG. 9B is a 3-dimensional image showing the small-signal gain for the apparatus shown in FIG. 9A. Note that in the direction of line 72, the small-signal gain is substantially gaussian. Along the direction of line 74 the small-signal gain is substantially flat. Note that lobes at points 76 and 78 may tend to produce the $TEM_{01}$ mode in the single gain material configuration unless an aperture is used as described above.

FIG. 10A is a schematic view of another gain material 80 which is oriented 90° about the optical axis from the gain material 66 shown in FIG. 9A. FIG. 10B is a 3-dimensional image showing the small-signal gain from the apparatus of FIG. 10A.

FIG. 11A is a schematic view superimposing the ray tracing representations of the FIGS. 9A and 10A. FIG. 11B is a 3-dimensional image showing the combined small-signal gain through the apparatus of FIG. 11A. This figure shows the almost circularly symmetric and gaussian profile of the combined small-signal gains. For some combinations, the small signal gain distribution may be rectangular rather than circular. That is, the small-signal gain will be symmetric about two orthogonal lines. The combined small signal gain shown in FIG. 11B preferentially supports the $TEM_{00}$ mode.

Additionally, looking again at FIGS. 9A and 9B, the gain material 66 is cooled at sides 66c and 66d. For that reason, the temperature in the gain material 66 will look similar to the graph of the small-signal gain shown in FIG. 9b which would correspond to a cylindrical thermal lens. In the same manner, the gain material 80 of FIGS. 10A and 10b corresponds to a cylindrical thermal lens which is oriented 90° about the optical axis from the cylindrical thermal lens of FIGS. 9A and 9B. For this reason, the thermal lenses for the combined system will form a substantially spherical thermal lens which is easier to compensate for than a cylindrical lens.

FIG. 12 is a schematic representation of one possible embodiment of the present invention giving a side view of a laser device 82 showing the optical gain component 83 including two gain materials 66' and 80'. The two gain materials 66' and 80' do not have Brewster-angled ends. The ends of the two gain materials 66' and 80' are near normal with respect to the optic axis 90 through the optical gain component 83. The gain material 66' is pumped through cylindrical lens 84 and a cylindrical lens (not shown) on the other side. The gain material 80' is pumped through cylindrical lenses 86 and 88. The gain material 80' is pumped through a side 80a oriented at a rotation of substantially 90° about the optical axis 90 from the side 66b' pumped on gain material 66'. The laser device includes a spherical lens 92 for compensating the combined spherical thermal lens of both gain materials 66' and 80'. The 90° rotation about the optical axis 90 can be visualized by imagining a screw running along the optical axis 90.

In the optical gain component 83, the side 66b' is substantially perpendicular to the sides 80a and 80b which are pumped by the laser diodes not shown.

A spherical lens for compensating the thermal lens formed by gain materials 66' and 80' can be formed by grinding a negative contour on an end of one of the gain materials 66' or 80' since neither gain material has Brewster-angled ends.

FIG. 13A is a top schematic view of another embodiment of a laser device 104 showing an optical gain component 107 of the present invention. The optical gain component 107 includes a gain material 106 and gain material 108. FIG. 13B is a side schematic view of the embodiment of the laser device shown in FIG. 13A. Both of these schematics are oriented such that the optical axis 105 through the gain material 106 is along the Y axis. FIG. 13C is a graph which is used to show the vectors for FIGS. 13A and 13B.

These diagrams show a normal $N_1$ to the face 106a which is pumped by a stack of laser diode bars (not shown) and a normal $N_2$ to the face 108a of gain material 108 which is pumped by another stack of laser diode bars (not shown). The normal $N_1$ runs along the X axis.

The optical axis 105 goes through the first gain material 106 and second gain material 108. Since the gain materials 106 and 108 have Brewster-angled ends, the optical axis 105 changes orientation in the laser cavity. The laser device 104 includes a half-wave plate or 90° quartz rotator 114 which is used to compensate for the different orientations of the Brewster angled ends.

$O_1$ is a vector that defines the orientation of the optical axis 105 in the first gain material 106. $O_2$ is a vector that defines the orientation of the optical axis 105 in the second gain material 108. The vectors $N_1$ and $O_1$ define a plane, which is shown in FIG. 13C as the XY plane. A projection of the vector $O_2$ onto this plane (the XY plane) is shown as the vector $P_2$. A vector $V_1$ in the plane (the XY plane) is orthogonal to vector $P_2$. The normal $N_2$ through the first side of the second material is oriented at substantially a 90° rotation about the optic axis $O_2$ in said second gain material from said first vector $V_1$. Note that the length or the sign of the vectors discussed above does not affect the above analyses.

Because the first gain material 106 and the second gain material 108 are oriented in the above described manner, the total small-signal gain can be almost circularly symmetric and gaussian in profile with a large center peak tapering off to a much lower gain at the edges.

The above specified orientation describes the laser device 82 of FIG. 12 in a more trivial fashion. FIG. 14 is a graph which is used to show the vectors for FIG. 12. The optical axis 90 does not change orientation in the laser device 82 so vector $O_1'$ giving the orientation of the optical axis in gain material 66' and vector $O_2'$ giving the orientation of the optic axis in gain material 80' both run along the Y axis. The normal $N_1'$ runs along the X axis. Vectors $O_1'$ and $N_1'$ define the XY plane. The projection $P_2'$ of the vector $O_2'$ into the XY plane is the vector $O_2'$. $V_1'$ is orthogonal to $P_2'$ in the XY plane. Rotating $V_1'$ substantially 90° about the vector $O_2'$ gives the normal $N_2'$. The normal $N_2'$ to the pumped side 80a is along the Z axis as shown in FIG. 12.

FIG. 15 is a perspective view of an alternate embodiment of a laser device 94 showing the optical gain component 95 of the present invention. This alternate embodiment shows the use of two gain material rods 96 and 98 to produce a saddle-shaped small-signal gain that is twice as large as the gain of the optical gain component 57 shown in FIG. 7. Looking again at FIG. 15, gain material 96 is pumped from side 96a and gain material 98 is pumped through side 98a. This orientation has the benefit that the optical axis lays in a plane. Any number of gain material rods can be placed in the cavity in this manner to get the desired small-signal gain.

Various details of the implementation and method are merely illustrative of the invention. It is to be understood that various changes in such details may be within the scope of the invention, which is to be limited only by the appended claims.

What is claimed is:

1. An optical gain component comprising:

a gain material with a rectangular cross-section having four sides and two ends;

two positive cylindrical lenses attached on their planar surfaces to opposite sides of the gain material; and two stacks of at least one laser diode bars arranged so as to pump the gain material through the lenses.

2. The optical gain component of claim 1, wherein the cylindrical lenses are attached to the opposite sides of the gain material with an optical cement.

3. The optical gain component of claim 1, wherein central axes of each stack of at least one diode bars are arranged substantially parallel to the long axes of the cylindrical lenses.

4. The optical gain component of claim 1, wherein the two opposite sides comprise a first and second side and wherein the gain material includes a reflective coating on a portion of the second side of the gain material so that a pumping beam from one of the stacks is reflected by the reflective coating back into the gain medium and further comprising a second reflective coating on a portion of the first side so that a pumping beam from the other of the two stacks is reflected by the second reflective coating back into the gain material.

5. The optical gain component of claim 1, wherein the gain material is Nd:YAG.

6. The optical gain component of claim 1, wherein the gain material is a Brewster-angle-ended rectangular rod.

7. The optical gain component of claim 1, further comprising a cooling apparatus including two cooling means connected to the two sides of the gain material perpendicular to the pumped sides.

8. The optical gain component of claim 7, wherein the cooling apparatus is arranged such that when the optical gain component is on, the gain material has a temperature predominantly determined by the distance from the two sides of the gain material connected to the two cooling means.

9. The optical gain component of claim 8, wherein the gain material and cooling apparatus forms a cylindrical thermal lens.

10. The optical gain component of claim 9, further comprising a compensating lens in the optical axis of the optical gain component.

11. The optical gain component of claim 7, wherein the cooling means comprises a compliant, thermally-conductive material in intimate contact with the two sides.

12. The optical gain component of claim 11, wherein the compliant, thermally-conductive material comprises indium foil.

13. The optical gain component of claim 1, wherein the gain material is arranged to be pumped so that it has a saddle-shaped gain profile.

14. The optical gain component of claim 1, further comprising a second gain material with a rectangular cross-section having four sides and two ends, an additional two cylindrical lenses attached to two opposite sides of the second gain material and an additional two stacks of at least one laser diode bars arranged so as to pump the second gain material through the additional lenses.

15. The optical gain component of claim 14, wherein the first and second gain materials have Brewster-angled ends.

16. The optical gain component of claim 14, wherein the first and second gain materials have ends which are near normal with respect to an optical axis through the optical gain component.

17. The optical gain component of claim 14, wherein the second gain material is oriented at a different orientation about the optic axis of the optical gain component from the first gain material in a manner that the combined gain profile is improved over the gain profile of either of the two gain materials alone.

18. The optical gain component of claim 17, wherein the first and second gain materials are each arranged to be pumped so that they each have a saddle-shaped gain profile.

19. The optical gain component of claim 18, wherein the total gain profile of the laser through the first and second gain materials is substantially circular and gaussian in profile with a large center peak tapering off to a much lower gain at the edges.

20. The optical gain component of claim 1, wherein the cylindrical lenses are arranged such that the cylindrical lenses roughly collimate the pumping energy into the two opposite sides of the gain material.

21. An optical gain component comprising:
a gain material with a rectangular cross-section having four sides and two ends;
two stacks of non-collimated laser diode bars arranged to emit pumping energy into two opposite sides of the gain material; and
two cylindrical lenses arranged in the path of the pumping energy to roughly collimate the pumping energy into the two opposite sides of the gain material.

22. The optical gain component of claim 21, wherein the cylindrical lenses are in close proximity to the two opposite sides of the gain material.

23. The optical gain component of claim 21, wherein the central axes of the stacks of non-collimated diode bars are arranged to be substantially parallel with long axes of the cylindrical lenses.

24. The optical gain component of claim 21, wherein the two opposite sides comprise a first and second side and wherein the gain material includes a reflective coating on a portion of the second side of the gain material so that a pumping beam from one of the stacks is reflected by the reflective coating back into the gain medium and further comprising a second reflective coating on a portion of the first side so that a pumping beam from the other of the two stacks is reflected by the second reflective coating back into the gain material.

25. The optical gain component of claim 21, further comprising a cooling apparatus including two cooling means connected to the two sides of the gain material perpendicular to the pumped sides.

26. The optical gain component of claim 25, wherein the gain material and cooling apparatus forms a cylindrical thermal lens.

27. The optical gain component of claim 26, further comprising a compensating lens in the optical axis of the optical gain component.

28. The optical gain component of claim 21, wherein the gain material is arranged to be pumped so that it has a saddle-shaped gain profile.

29. The optical gain component of claim 21, further comprising a second gain material with a rectangular cross-section having four sides and two ends, an additional two stacks of at least one laser diode bars arranged so as to emit pumping energy into two opposite sides of the second gain material, and an additional two cylindrical lenses arranged in the path of the pumping energy from the additional stacks to roughly collimate the pump energy into the two opposite sides of the second gain material.

30. The optical gain component of claim 29 wherein the second gain material is oriented at a different orientation about the optic axis of the optical gain component from the first gain material in a manner that the combined gain profile is improved over the gain profile of either of the two gain materials alone.

31. The optical gain component of claim 30, wherein the total gain profile of the optical gain component through the first and second gain materials is substantially circular and gaussian in profile with a large center peak tapering off to a much lower gain at the edges.

32. A method of forming a laser beam including the steps of:
providing a gain material with a rectangular cross-section, four sides and two ends;
pumping the gain material through two cylindrical lenses from two opposite sides with two stacks of at least one laser diode bars such that the gain material has a saddle shaped gain profile.

33. The method of claim 32, further comprising the step of attaching the two cylindrical lenses to the first gain material.

34. The method of claim 32, further comprising the step of aligning the long axis of one of the two stacks of at least one diode bars with the long axis of one of the two cylindrical lenses and aligning the long axis of the other of the two stacks of at least one diode bars with the long axis of the other of the two cylindrical lenses.

35. The method of claim 32, further comprising the step of providing a second gain material with a rectangular cross-section, four sides and two ends and the step of pumping the second gain material from two opposite sides of the first gain material with two stacks of at least one laser diode bars such that the second gain material has a saddle shaped gain profile.

36. The method of claim 35, wherein the optical gain component forms an optical axis and further comprising the step of orienting the first and second gain materials in the optic axis such that the total combined gain profile of the two gain materials is substantially circular and gaussian in profile with a large center peak tapering off to a much lower gain at the edges.

37. The method of claim 32, further comprising cooling the gain material by placing a thermally conductive material onto the sides of the gain material perpendicular to the two opposite sides such that the gain material has a temperature predominantly determined by the distance from the two sides of the gain material contacting the thermally conductive material.

38. The method of claim 37, wherein the method further comprises providing a second gain material with a rectangular cross-section, four sides and two ends; pumping the second gain material from two opposite sides of the second gain material with another two stacks of at least one laser diode bars such that the second gain material has a saddle shaped gain profile; and cooling the second gain material by placing a thermally conductive material onto the two sides of the second gain profile perpendicular to the two pumped sides of the second gain material such that the second gain material has a temperature predominantly determined by the distance from the two cooled sides of the second gain material.

39. The method of claim 32, wherein the pumping step includes roughly collimating the pumping energy into the two opposite sides of the gain material.

* * * * *